United States Patent Office 3,073,269
Patented Jan. 15, 1963

3,073,269
METALLIC BRAZING MIXTURE
George Sidney Hoppin III, Hamilton, and Ralph Henry Schwegman, Loveland, Ohio, assignors to General Electric Company, a corporation of New York
No Drawing. Filed Dec. 24, 1957, Ser. No. 704,901
10 Claims. (Cl. 113—110)

This invention relates to metallic brazing mixtures. It is particularly concerned with elevated temperatures brazing mixtures which reduce erosion and dissolving of the structure being brazed and which result in ductile brazed joints especially when used in joining thin metal structures.

In the design of components for use in flight propulsion engines as well as in the engine carrier or air frame itself, a major consideration is the weight of the component. Weight reduction without sacrifice of structural strength may be realized through the use of light weight fabrications such as honeycomb sandwiches or similar structures. In such structures, voids are sometimes maintained between thin facing sheets by creating cellular compartments bounded by thin metal strips or hollow metal objects. This compartmented structure is called the core of the honeycomb sandwich. A method of bonding the metal strips of the honeycomb or the hollow metal objects to each other and to the thin facing sheets is by brazing them together at least at some of the many points of contact. With the advent of high speed aircraft where these light weight structures are subjected to elevated temperatures, any brazing methods used to assemble the structures should include the use of high temperature brazing alloys.

The recent introduction of nickel base brazing alloys made possible for the first time the use of brazing as a feasible fabrication method for extreme high temperature machine parts and assemblies. Prior to the advent of these alloys, the maximum safe service temperature for brazed assemblies had been about 800° F. This limit was dictated by the poor high temperature strength and oxidation resistance of silver and copper base brazing alloys. The inherently good high temperature properties of the nickel-based brazing alloys resulted in the occurrence of a dramatic break-through of the "thermal barrier" to brazing that had exisited. The safe service temperature for brazed parts soared over a thousand degrees Fahrenheit to 2000° F., and a totally new range of applications for brazing resulted. The fabrication by brazing of many critical high temperature parts for automotive, aircraft, and atomic energy equipment has since occurred.

High temperature brazing has been performed mainly with three classes of alloys: (1) nickel-chromium-silicon-boron, (2) nickel-silicon-boron, and (3) nickel-chromium-silicon. High temperature brazing alloys gain their high temperature strength by actually altering their compositions during brazing. Such alteration is brought about by certain elements, examples of which are boron and silicon, diffusing out of the brazing alloy and into the metal being bonded. Not only do these elements help to promote good bonding by contributing some fluxing action, but they also lower the melting range of the brazing alloy during the brazing operation and raise the melting point of the finished brazed joint. However, this diffusion action is responsible for the erosion during brazing of thin materials. This application of high temperature brazing to flight propulsion engine components has not been at all a straight forward process. It has been necessary to solve a number of peculiar metallurgical problems to produce good quality parts when using high temperature brazing alloys. Four key problems in brazing applications have been: (1) dissolving of the base materials by the brazing alloys, (2) the brittleness of the joints produced, (3) adverse effects on parent metals caused by the brazing process, and (4) atmosphere purity requirements of the process. When parts being brazed are small, heating cycles can be limited to relatively short times and the problem of dissolving or erosion of the base materials is not so severe. When large fabrications or fabrications requiring heavy fixturing are to be brazed, it is impossible to limit the heating cycle to a short time. Erosion of very thin materials will invariably result when using the brazing alloys available commercially today. Furthermore, excessive brittleness has been found in high temperature brazed joints as a consequence of the high hardness of eutectic phases present in brazing alloys. This is understandable since many of the alloys were originally developed as hard-facing materials. There are no brazing alloys or brazing mixtures available which will allow the joining of thin materials, for example of 0.005" or less in thickness, without causing disastrous and prohibitive erosion and dissolving of the thin material adjacent to the joint.

A primary object of the present invention is to obviate the above mentioned difficulties by providing a brazing mixture which will greatly reduce the erosion or dissolving action resulting from the use of conventional, commercially available brazing alloys alone.

Another object is to provide a brazing mixture which will permit the brazing of heretofore unbrazable thin sheet material.

A further object of our invention is to provide a brazing mixture which will produce joints of greatly improved ductility.

Briefly stated, in accordance with one aspect of our invention, we greatly reduce the erosion and dissolving action resulting from the use of a brazing alloy alone and increase the ductility of the brazed joint by mixing with such brazing alloy a quantity of a powdered metal or metal alloy to preferentially link with the brazing alloy elements causing such erosion and dissolving action. In practicing our invention in its broader aspects, it will occur to those skilled in the art of brazing and joining that a variety of types and sizes of powders may be combined under varying conditions to produce our novel result.

Some migrating elements normally found in high temperature brazing alloys are boron and silicon. During the brazing operation they diffuse out of high temperature brazing alloys into a structure being brazed thereby causing erosion or dissolving of the structure. We have found that certain materials, when mixed with a powdered brazing alloy and used as a brazing mixture, will preferentially alloy with such migrating elements. In addition to the dissolving or eroding action, excessive brittleness of joints frequently results from the use of brazing alloys alone. Through the use of our invention there results after brazing a structure which is not eroded or dissolved at the brazed joints and which is joined by a more ductile bond.

Our invention will be better understood from our description and the succeeding examples which are given by way of illustration only and not in any sense by way of limitation. Its scope will be pointed out in the appended claims.

Investigations have disclosed that boron causes nickel base brazing alloys to be considerably more erosive than does silicon. This is to be expected because the liquidus temperature of nickel binary alloys is reduced 140° F. per percent boron (up to 4 weight percent) and only 49° per percent silicon (up to 11 weight percent).

We had observed that erosion generally took place at the points of application of the powdered brazing alloy. Since most brazed fabrications require some brazing alloy flow, an excess of brazing alloy must be applied at certain points to provide a reservoir of alloy to flow. The excess at these points contains enough silicon locally to erode the base material through diffusion. We reasoned that this erosion could be eliminated by providing a "sponge" material into which the excess silicon could diffuse. Specifically we preferred to use a nickel-chromium-silicon type of brazing alloy in powder form to which we add essentially pure nickel powder to act as a "sponge" or preferential alloying agent with the silicon which migrates or diffuses during the brazing operation.

Even though boron contained in nickel base brazing alloys will cause them to be considerably more erosive than will silicon, there are brazing alloys in use that contain boron as well as silicon. An example of such a brazing alloy of the nickel-chromium-silicon-boron general classification is the nickel base alloy known as AMS4775A having the following composition:

| | Percent by weight |
|---|---|
| Carbon | .95 |
| Silicon | 4 |
| Chromium | 17 |
| Nickel | 70 |
| Cobalt | 1 max. |
| Iron | 4 |
| Boron | 3.75 |

Another nickel base brazing alloy containing boron and silicon is one of the nickel-boron-silicon general classification known as AMS4778 having the following composition:

| | Percent by weight |
|---|---|
| Carbon | 0.5 max. |
| Silicon | 3–5 |
| Nickel | 89–95 |
| Cobalt | 1. max. |
| Boron | 1.8–3.5 |

We mix intimately 70–90% by weight standard commercial brazing alloy with 10–30% by weight metal powder and place that mixture on the joint to be brazed. This placement may involve the following types of operations: (1) combining the metal powder with the binder so as to form a paste or slurry which will adhere to the pieces to be brazed, (2) flame spraying the powder onto the surface of the piece or (3) merely placing the dry powder on the joint to be brazed. The above mentioned binder used by us was selected from the group of polymerized materials which when heated depolymerize into volatile monomers without undergoing thermal cracking and without forming residues such as carbon. Examples of such binders are solutions of acrylics and polybutenes.

After we place our brazing mixture on the joint to be brazed of a part which can be held together if desirable by a temporary brazing fixture, we insert that part into a brazing furnace. The furnace atmospheres which are satisfactory for our process are inert gas, vacuum or reducing atmospheres. The temperature of the brazing furnace is then increased to the high temperature brazing alloy's specified brazing temperature, generally between 1740–2300° F., whereat the part is held from one half to sixty minutes to allow the brazing alloy to flow into place. Then the part is cooled either by turning off the brazing furnace or removing the part to a cooling zone adjacent to the brazing furnace. In any case, the cooling is carried out while the part is still in one of the three types of atmospheres mentioned above. We have found that using our brazing mixture to join thin sheet material especially in thicknesses below 0.005", we greatly reduce and control the erosion and dissolving action normally found when using brazing alloys alone. In addition, we found that the brazed joints so formed have greater ductility than those obtained through the use of brazing alloys alone.

The preferred composition range which we have successfully used for our brazing mixture is 10–30% by weight metallic powder intimately mixed with 70–90% by weight powdered brazing alloy. The following specific examples are illustrative of the variety of combinations of materials and proportions which have been successful in the performance of our invention and are not meant to be limitations.

EXAMPLE 1

To eliminate erosion caused by boron diffusion, a boron-free alloy of the nickel-chromium-silicon general classification and having the following composition was used for the brazing of honeycomb core and other thin materials:

| | Percent by weight |
|---|---|
| Nickel | Remainder |
| Chromium | 19 |
| Silicon | 10 |
| Iron, max. | 5 |
| Manganese, max. | 1 |
| Carbon, max. | 0.25 |

Although the above described brazing alloy was considerably less erosive than boron containing alloys, under certain brazing conditions we found that it too eroded thin materials.

We intimately mixed about 80% by weight of the above-described powdered brazing alloy of about 325 mesh size with about 20% by weight nickel powder of about 325 mesh size. Next we combined that mixture with enough of a solution of acrylic resin in toluene to form a paste which was placed on the joint to be brazed of a part held together temporarily by a holding fixture. In this example the part was composed of two honeycomb panels having a core 0.002" thick and a facing 0.010" thick of A.I.S.I. type 321 stainless steel, an iron base alloy. We placed the part thus assembled in a brazing furnace, the air atmosphere of which we then replaced with a dry hydrogen atmosphere. The temperature of the brazing furnace was raised to about 2200° F. specified for the brazing alloy. We held the part in the furnace for a time sufficient to allow the brazing alloy to flow into place. In this specific example the time was 5 minutes. Prior to our removal of the part for inspection, we moved it to a cooling section of the furnace still within the furnace atmosphere. Although previous attempts to braze 0.002" core A.I.S.I. type 321 stainless steel honeycomb material resulted in excess erosion and dissolving of the thin sheet material and in rough surfaced brittle joints, our brazing mixture's use resulted in a brazed joint which evidenced very little erosion and dissolving action, which proved to be a more ductile joint than joints secured by the above described brazing alloy alone and which resulted in a braze having a smooth surface.

Following the same procedures and using the same materials as in Example 1 above, the amount of nickel powder added to the brazing alloy was varied in the following Examples 2–7 to obtain the following results:

| Example | Percent by Wt. Nickel Powder | Erosion and Dissolution Effect | Remarks |
|---|---|---|---|
| 2 | 5 | no change | |
| 3 | 10 | improvement | |
| 4 | 15 | great improvement | |
| 5 | 25 | do | flow reduced. |
| 6 | 30 | do | flow greatly reduced. |
| 7 | 35 | | flow too poor. |

EXAMPLE 8

In order to compare the breaking load and shear strength of joints formed by our new brazing mixture with those formed by the brazing alloy alone, we prepared two groups of samples of simple lap joints using 0.063" cobalt base material of the following composition:

| | Percent by weight |
|---|---|
| Carbon | 0.1 |
| Manganese | 1.5 |
| Silicon | .05 |
| Sulfur | 0.02 |
| Phosphorous | 0.02 |
| Chromium | 20 |
| Nickel | 10 |
| Iron | 2 |
| Tungsten | 15 |
| Cobalt | Balance |

We used the same mixture of brazing alloy and nickel powder and the same procedure described in Example 1 above to prepare these sample lap joints having a joint clearance of 0.002"–0.003". The average comparative results of our tensile tests are shown in Table I below:

*Table I*

[A = brazing alloy alone; B = our mixture]

| Type | Joint Overlap (inches) | Breaking Load (pounds) | Indicated Shear Strength (p.s.i.) |
|---|---|---|---|
| A | .05 | 1,820 | 72,800 |
| B | .05 | 1,990 | 80,200 |
| A | .10 | 1,440 | 28,700 |
| B | .10 | 2,010 | 40,300 |

The same excellent reduction in erosion and dissolving of the thin materials being joined as well as the increase in ductility and smoothness of the brazed joint was achieved in the following Examples 9–23:

EXAMPLE 9

Example 1 was repeated except that essentially pure about 325 mesh size cobalt powder was substituted for the nickel powder.

EXAMPLE 10

Example 1 was repeated except that essentially pure about 325 mesh size cobalt powder was substituted for the nickel powder, and the cobalt base sheet material described in Example 8 was substituted for the A.I.S.I. type 321 stainless steel in the thicknesses shown in Example 1.

EXAMPLE 11

Example 1 was repeated except that powder of the iron base alloy A.I.S.I. type 302 stainless steel of about 325 mesh size was substituted for the nickel powder.

EXAMPLE 12

Example 1 was repeated except that powder of the following nickel base alloy was substituted for the nickel powder:

| | Percent by weight |
|---|---|
| Nickel | 79 |
| Chromium | 20 |
| Silicon | 1 |
| Carbon | 0.05 |

EXAMPLE 13

Example 1 was repeated except that powder of the following cobalt base alloy was substituted for the nickel powder:

| | Percent by weight |
|---|---|
| Carbon | 0.4 |
| Manganese | 0.6 |
| Silicon | 0.6 |
| Chromium | 25 |
| Nickel | 10 |
| Cobalt | 55 |
| Tungsten | 8 |
| Iron | 1 |

EXAMPLE 14

Example 1 was repeated except that the following nickel base sheet material was substituted for the iron base A.I.S.I. type 321 stainless steel sheet material:

| | Percent by weight |
|---|---|
| Nickel | 79 |
| Chromium | 20 |
| Silicon | 1 |
| Carbon | 0.05 |

EXAMPLE 15

Example 1 was repeated except that the following cobalt base sheet material was substituted for the iron base A.I.S.I. type 321 stainless steel sheet material:

| | Percent by weight |
|---|---|
| Carbon | 0.1 |
| Manganese | 1.5 |
| Silicon | .05 |
| Sulfur | 0.02 |
| Phosphorous | 0.02 |
| Chromium | 20 |
| Nickel | 10 |
| Iron | 2 |
| Tungsten | 15 |
| Cobalt | Balance |

EXAMPLE 16

Example 1 was repeated except that we substituted powdered AMS4775A for the brazing alloy described in Example 1 and reduced the brazing temperature to 2100° F., which is normal for AMS4775A.

EXAMPLE 17

Example 1 was repeated except that we substituted powdered AMS4778 for the brazing alloy described in Example 1 above and reduced the brazing temperature to 2000° F. which is normal for AMS4778.

EXAMPLE 18

Example 1 was repeated except that we mixed about 20% by weight of essentially pure cobalt powder with about 80% by weight of AMS4775A and substituted that mixture for the mixture of nickel powder and the nickel-chromium-silimon brazing alloy of Example 1. In addition, we lowered the brazing temperature to 2100° F.

EXAMPLE 19

Example 1 was repeated except that we mixed about 20% by weight of essentially pure cobalt powder with about 80% by weight of AMS4778 and substituted that mixture for the mixture of nickel powder and nickel-chromium-silicon brazing alloy of Example 1. In addition, we lowered the brazing temperature to 2000° F.

EXAMPLE 20

Example 1 was repeated except that we mixed about 20% by weight of essentially pure nickel powder with about 80% by weight of a powdered brazing allow comprising in percent by weight about 1.5–2.5 silicon, 0.5–2 boron with the balance essentially nickel and impurities. We substituted that mixture for the mixture of nickel powder and nickel-chromium-silicon brazing alloy of Example 1.

EXAMPLE 21

Example 1 was repeated except that we mixed about 20% by weight of essentially pure nickel powder with about 80% by weight of a powdered brazing alloy comprising in percent by weight about 2.5–5.5 silicon, 2–5 boron with the balance essentially nickel and impurities. We substituted that mixture for the mixture of nickel powder and nickel-chromium-silicon brazing alloy of Example 1. In addition we lowered the brazing temperature to about 2100° F.

EXAMPLE 22

Example 1 was repeated except that we mixed about 20% by weight of essentially pure cobalt powder with about 80% by weight of a powdered brazing alloy comprising in percent by weight about 1.5–2.5 silicon, 0.5–2 boron with the balance essentially nickel and impurities. We substituted that mixture for the mixture of nickel powder and nickel-chromium-silicon brazing alloy of Example 1.

EXAMPLE 23

Example 1 was repeated except that we mixed about 20% by weight of essentially pure cobalt powder with about 80% by weight of a powdered brazing alloy comprising in percent by weight about 2.5–5.5 silicon, 2–5 boron with the balance essentially nickel and impurities. We substituted that mixture for the mixture of nickel powder and nickel-chromium-silicon brazing alloy of Example 1. In addition, we lowered the brazing temperature to about 2100° F.

In the foregoing description we have disclosed a brazing mixture formed by adding a metallic powder to a powdered metallic brazing alloy for use in brazing of heretofore unbrazable thin sheet materials. Although we have described our present invention in conjunction with specific examples, these examples are to be construed as illustrative of rather than limitations on our broad idea of forming such a brazing mixture for the purpose of controlling erosion and dissolving action during brazing and for increasing the ductility and smoothness of brazed joints. Those skilled in the art of brazing and joining will readily understand the modifications and variations of which our invention is capable, for example, as to the variation of types and sizes of powders in the mixture, the time and temperature cycles of brazing, the brazing atmospheres involved, the types and thicknesses of metals being joined and the methods of application of mixture to the joint to be brazed. We intend in the appended claims to cover modifications and variations that come within the true spirit and scope of our invention.

What we claim as new and desire to secure by Letters Patent of the United States is:

1. A metallic brazing mixture consisting essentially of about 10–30% by weight of a powdered metal selected from the group consisting of iron, nickel, cobalt and their alloys and mixtures; and about 70–90% by weight of a powdered nickel-base brazing alloy containing significant amounts of at least two elements selected from the group consisting of chromium, silicon, and boron, formulated so as to have a melting point significantly lower than that of the powdered metal.

2. The mixture of claim 1 wherein the powdered metal is nickel.

3. The mixture of claim 1 wherein the powdered metal is cobalt.

4. The mixture of claim 1 in which is added a non-metallic binder.

5. A metallic brazing mixture consisting essentially of about 20% by weight of powdered nickel and about 80% by weight of a powdered nickel-base brazing alloy containing significant amounts of at least two elements selected from the group consisting of chromium, silicon, and boron, formulated so as to have a melting point significantly lower than that of said powdered nickel.

6. The metallic brazing mixture of claim 5 in which the powdered brazing alloy consists essentially of in percent by weight about 1.5–5.5 silicon, about 0.5–5 boron with the balance essentially nickel and impurities.

7. The metallic brazing mixture of claim 5 in which the powdered brazing alloy consists essentially of in percent by weight about 19 chromium, about 10 silicon with the balance essentially nickel and impurities.

8. A metallic brazing mixture consisting essentially of about 20% by weight of powdered cobalt and about 80% by weight of a powdered nickel-base brazing alloy containing significant amounts of at least two elements selected from the group consisting of chromium, silicon, and boron, formulated so as to have a melting point significantly lower than said powdered cobalt.

9. The metallic brazing mixture of claim 8 in which the powdered brazing alloy consists essentially of in percent by weight about 1.5–5.5 silicon, about 0.5–5 boron with the balance essentially nickel and impurities.

10. The metallic brazing mixture of claim 8 in which the powdered brazing alloy consists essentially of in percent by weight about 19 chromium, about 10 silicon with the balance essentially nickel and impurities.

References Cited in the file of this patent

UNITED STATES PATENTS

| | | |
|---|---|---|
| 2,220,961 | Kern | Nov. 12, 1940 |
| 2,362,893 | Durst | Nov. 14, 1944 |
| 2,403,109 | Miller | July 2, 1946 |
| 2,714,760 | Boam et al. | Aug. 9, 1955 |
| 2,722,735 | Beamish | Nov. 8, 1955 |
| 2,741,932 | Whitney et al. | Apr. 17, 1956 |
| 2,743,177 | Cape | Apr. 24, 1956 |
| 2,744,009 | Browne et al. | May 1, 1956 |
| 2,816,355 | Herman | Dec. 17, 1957 |
| 2,834,101 | Boam et al. | May 13, 1958 |
| 2,844,867 | Wernz et al. | July 29, 1958 |
| 2,864,696 | Foreman | Dec. 16, 1958 |
| 2,868,667 | Bowles | Jan. 13, 1959 |
| 2,899,302 | Cape et al. | Aug. 11, 1959 |
| 2,909,643 | Graves | Oct. 20, 1959 |

FOREIGN PATENTS

| | | |
|---|---|---|
| 487,263 | Great Britain | June 17, 1938 |